UNITED STATES PATENT OFFICE.

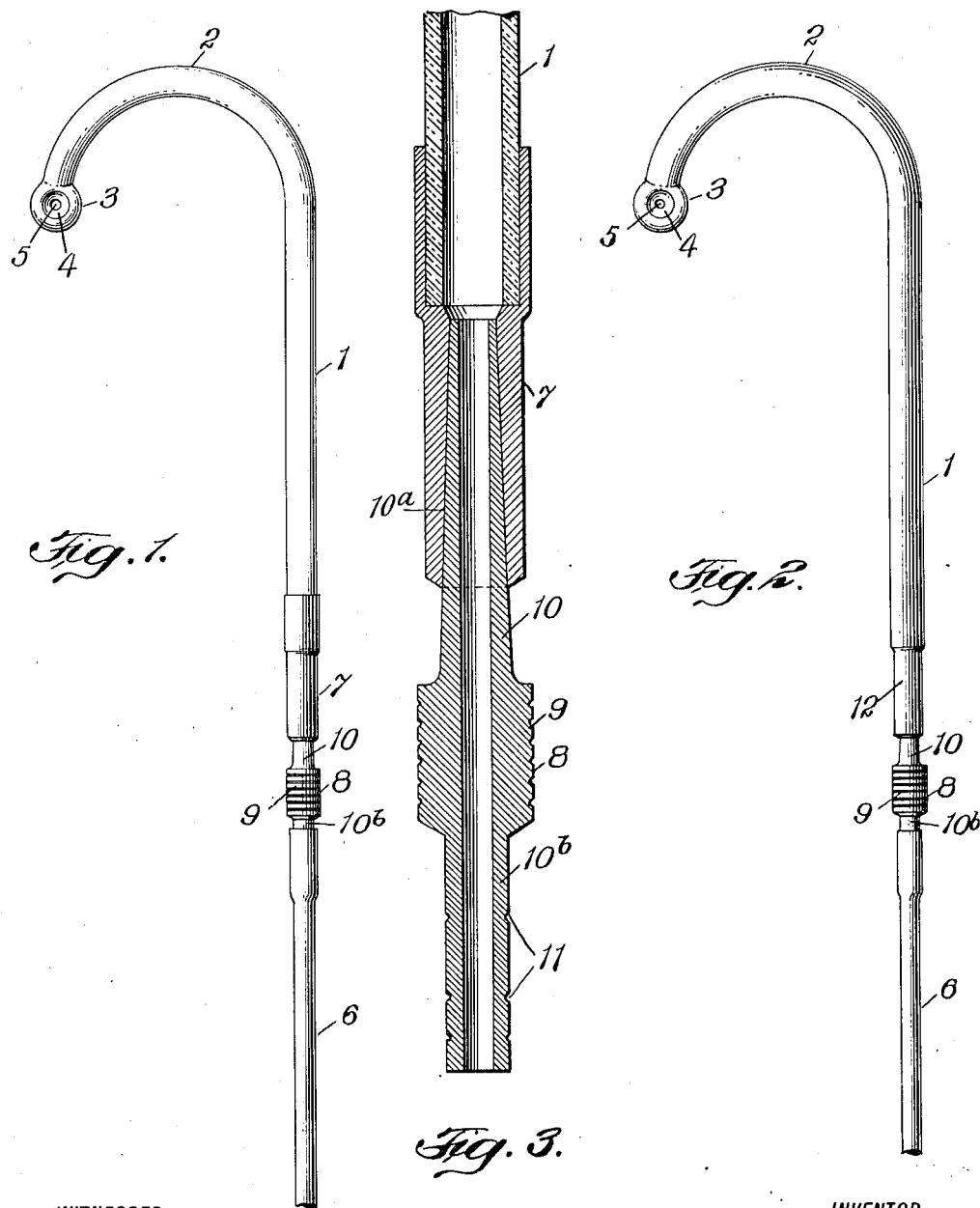

WILLIAM D. TRACY, OF NEW YORK, N. Y.

DENTAL APPLIANCE.

969,922.  Specification of Letters Patent.  Patented Sept. 13, 1910.

Application filed October 24, 1908. Serial No. 459,353.

*To all whom it may concern:*

Be it known that I, WILLIAM D. TRACY, a citizen of the United States, and a resident of New York, county and State of New York, have invented certain new and useful Improvements in Dental Appliances, of which the following is a full, clear, and exact description.

This invention relates more particularly to a coupling for detachably holding the members of saliva ejectors together.

The primary object of the invention is to provide a simple and efficient device which may be readily applied to the usual or any preferred form of saliva ejector in such a way that one of the members may be readily and quickly attached to or removed from the ejector tube member, thus overcoming the objections incident to the means ordinarily employed for this purpose.

A further object of the invention is to provide a simple and efficient coupling, which may be used in connection with dental appliances of various kinds.

With these and other objects in view, the invention will be hereinafter more particularly described with reference to the accompanying drawings, which form a part of this specification, and will then be pointed out in the claim at the end of the description.

In the drawings, Figure 1 is a side elevation of one form of device embodying my invention. Fig. 2 is a similar view to Fig. 1, except that the entire mouth member is made of a single piece of metal or other material; and Fig. 3 is an enlarged vertical section through the coupling.

In carrying out one application of the invention, a tube of suitable shape is provided, having one end formed with a suitable entrance device for receiving and conducting saliva from the mouth of a person into a tube. The other end of the tube which is of a suitable length, is provided with a coupling embodying the essential feature of the present invention, by means of which it may be readily attached to or detached from a pipe or tube for conducting the saliva to a suitable receptacle.

As shown in the accompanying drawings, the invention comprises a saliva conducting tube or member constructed with a straight portion 1, and a curved or hook portion or end 2, terminating in a suitable saliva entrance or portion and as here shown consists of a bulb 3, having lateral or concave recess portions 4 with a passage-way 5 connected with a passage-way in the tube of the instrument, the said member being made of glass or of other material as is usual in devices of this character. The construction just described is of such a shape as to adapt the device to be inserted into the mouth under the tongue and suspended from the mouth of the patient while being operated upon in the usual manner.

To detachably hold the saliva member of the ejector tube 6, I provide a ferrule 7 on the end of the part 1, to which may be quickly attached a coupling member 8, which has an enlarged milled or other surface or part 9 to permit the coupling member to be held by the fingers. Projecting from the part 9 is a smaller tapering and tubular part 10 which is adapted to fit into a similarly formed opening $10^a$ in the ferrule or member 7, and said tapering part may be ground or otherwise made to fit the opening $10^a$ so as to provide a tight joint between the two members, but which permits the coupling member to be quickly detached from the saliva member when it is desired to remove said latter member from or to attach said member to the tube 6. The coupling member 8 has an opening extending therethrough, so as to make the same tubular, and projecting from the part 9 and opposite the part 10 is a smaller part $10^b$ which is somewhat larger than the opening in the tube 6 so that the latter has to be forced over the same to provide a tight joint, and arranged around the part $10^b$ are one or more annular grooves 11, thus serving to properly hold the tube and coupling member properly together.

In Fig. 2 the construction is substantially the same as Fig. 1, except that the saliva member is integral instead of comprising the glass part 1 and the ferrule part 7 in which case the said saliva member may be made of brass, rubber or other material. In this case the member or part 12 is provided with a tapering opening similar to that shown in Fig. 3 for the reception of the tapering part 10, though it will be understood that either member may be the male or the female member, and may be separate from or integral with the mouth portion as desired.

From the foregoing it will be seen that a simple and efficient coupling is provided whereby the saliva member may be quickly attached to or detached from the tube or part 6; that a simple and efficient saliva ejecting appliance is provided, and that said coupling may be employed in connection with various forms of dental appliances.

Having thus described my invention, I claim as new and desire to secure by Letters Patent:—

In a coupling for tubes, a hollow member provided with a tapered opening extending for a portion of its length, an annular shoulder formed within said hollow member near one end thereof, said end exceeding the other end of said member in diameter and a tapered surface extending from the edge portion of the annular shoulder to the termination of the first mentioned tapered portion, the tapered end of said member being adapted to receive a device one end of which conforms in shape to said tapered portion, the other end being cylindrical and adapted to enter a flexible member, the central portion of the member being provided with an enlarged grooved surface, and the other end of the hollow member being adapted to incase the end portion of a tube, the end of said tube being adapted to rest upon said annular shoulder.

This specification signed and witnessed this 21st day of October A. D. 1908.

WILLIAM D. TRACY.

Witnesses:
   W. A. TOWNER, Jr.,
   A. REDMOND.